Nov. 26, 1968         H. G. HUGHEY         3,413,017
                    GAS LINE CONNECTORS
Filed Aug. 12, 1965                    7 Sheets-Sheet 1
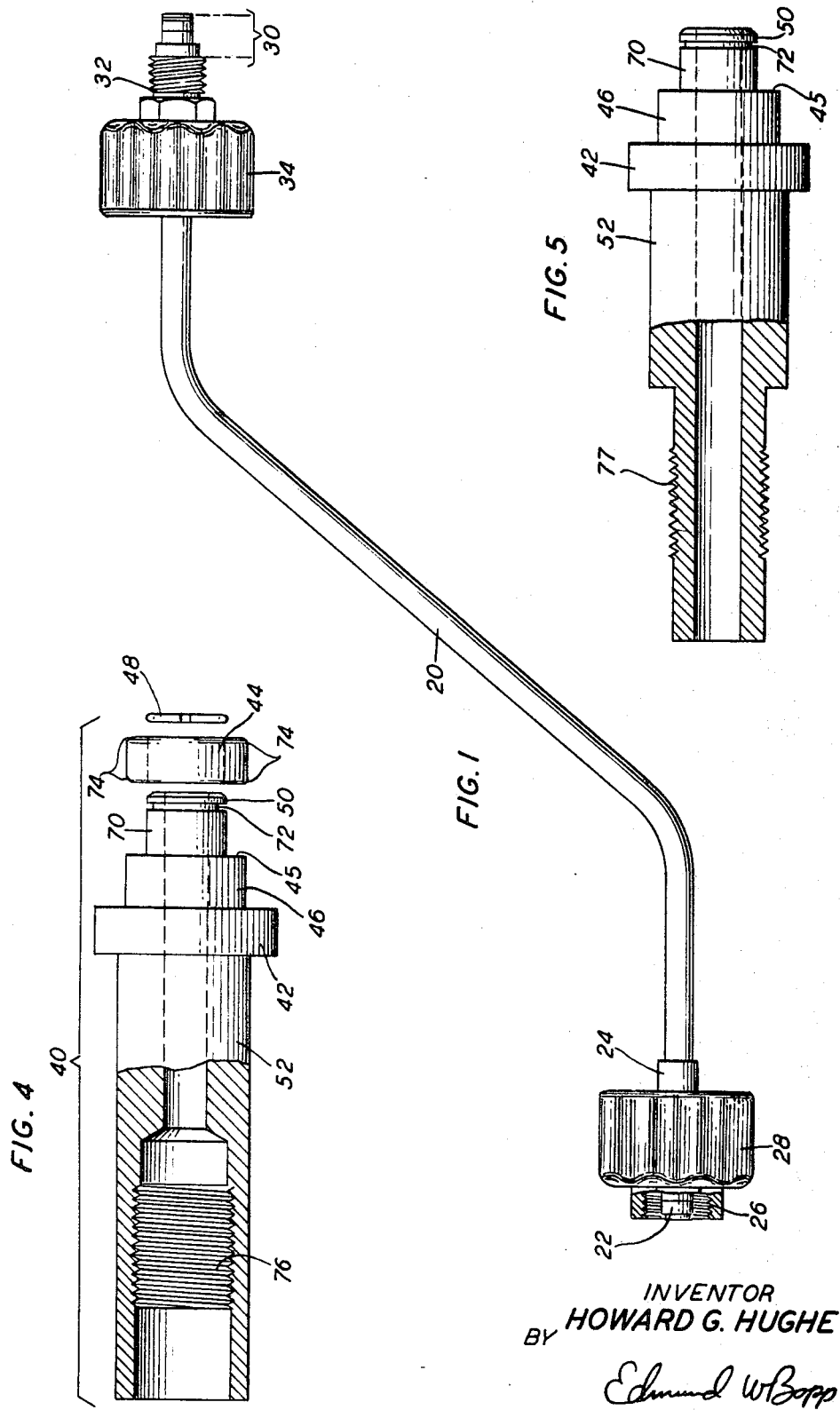
INVENTOR
HOWARD G. HUGHEY
BY
Edmund W. Bopp
AGENT

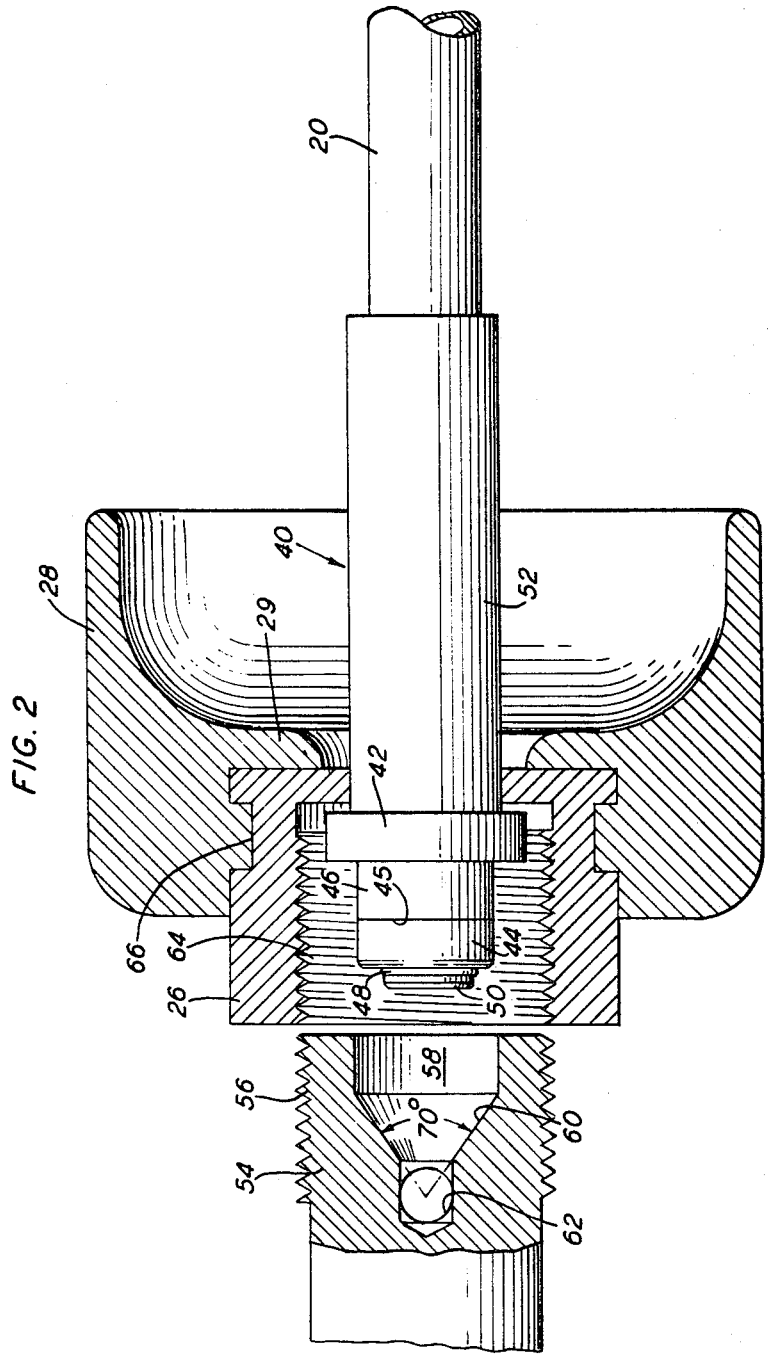

Nov. 26, 1968  H. G. HUGHEY  3,413,017
GAS LINE CONNECTORS
Filed Aug. 12, 1965  7 Sheets-Sheet 3
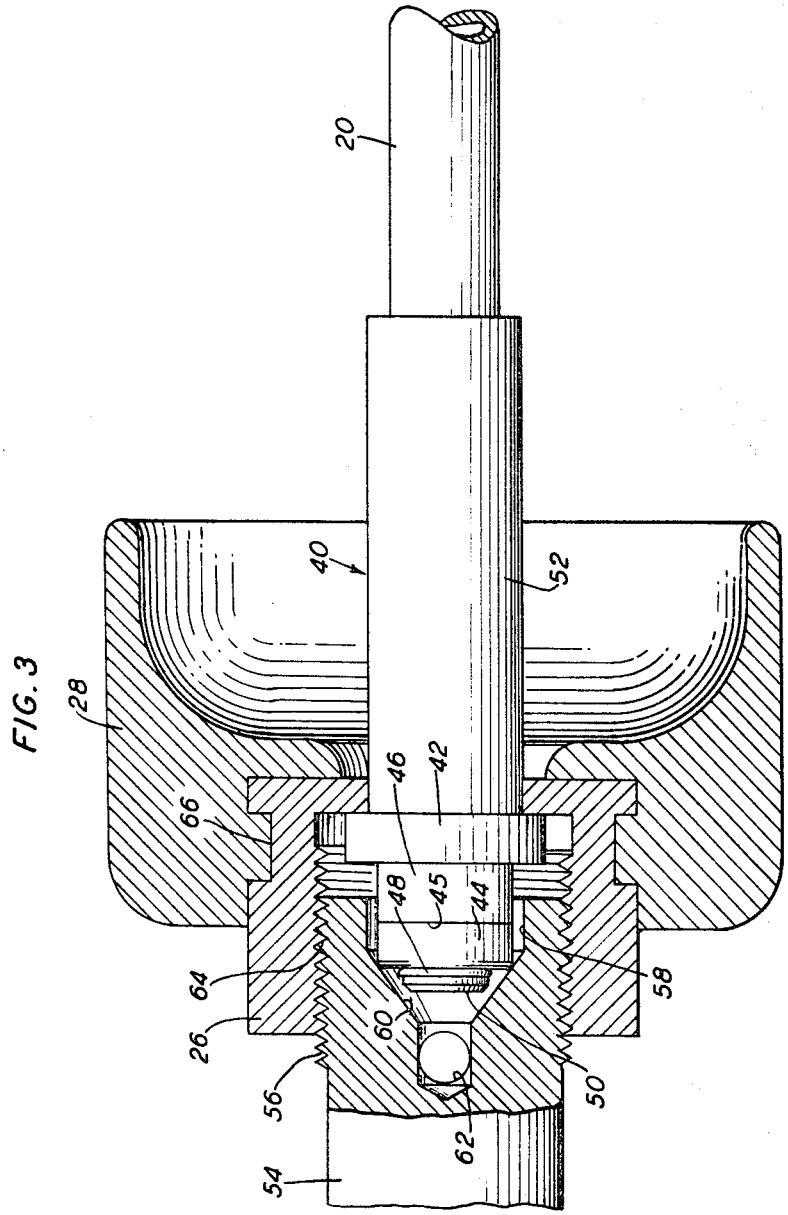
INVENTOR
HOWARD G. HUGHEY
BY
Edmund W Bopp
AGENT INVENTOR
HOWARD G. HUGHEY
BY
Edmund W Bopp
AGENT

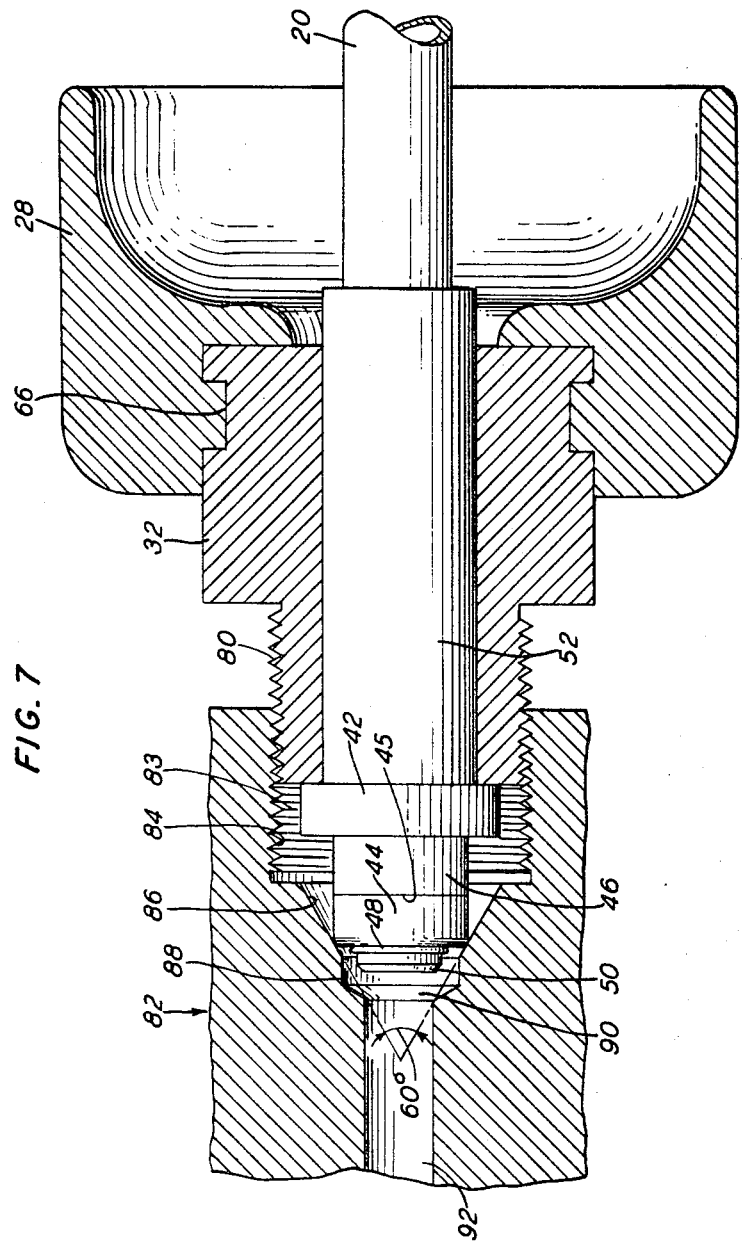

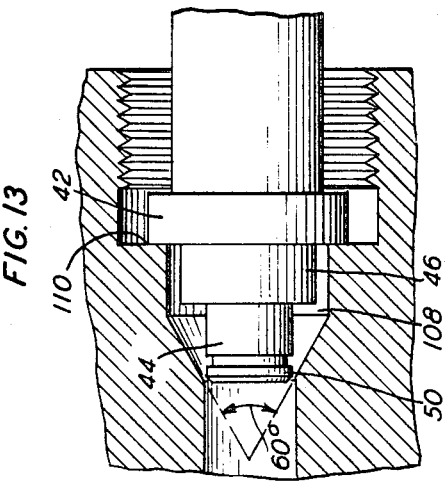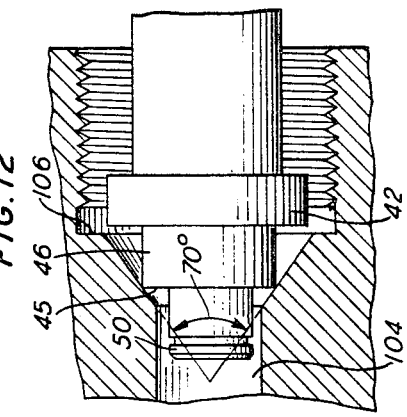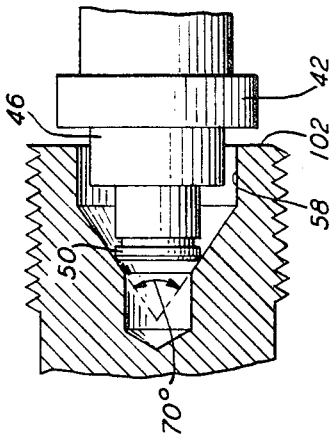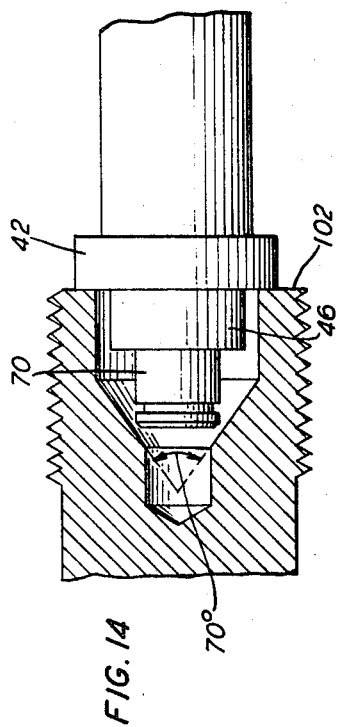

United States Patent Office 3,413,017
Patented Nov. 26, 1968

3,413,017
GAS LINE CONNECTORS
Howard G. Hughey, Fanwood, N.J., assignor to Air
Reduction Company, Incorporated, New York,
N.Y., a corporation of New York
Filed Aug. 12, 1965, Ser. No. 479,102
2 Claims. (Cl. 285—38)

ABSTRACT OF THE DISCLOSURE

A pipe coupler of the gland and nut type, designed for hand tightening, in which the gland has a replaceable plastic sealing sleeve that is not directly exposed to the force of a stream in the pipe and in which the gland is adapted to form an emergency seal in the absence of the sealing sleeve. The nut may be of various types incorporated into a universal design of hand grip knob structure by a die casting operation which forms the knob while keying the nut into a standardized cavity in the body of the knob.

---

This invention relates to gas line connectors or couplers and more particularly to thread and socket joints for use in a high pressure, high velocity gas line, for example a line connecting a manifold and a storage vessel, especially a standard cylinder.

The invention is particularly, though not exclusively, directed to connectors of the gland and nut type for use between a line and a threaded valve attached to a manifold or between a line and a threaded valve attached to a storage vessel, as commonly used in the compressed gas industry.

An object of the invention is to avoid danger to attendants in case a seating element of a joint which incorporates a relatively soft component part, such as a nonmetallic or plastic seating element, should become defective or break and any portion thereof should be propelled by the gas into the air at high speed, which speed could well be comparable to that of a bullet.

Another object is to facilitate replacing a seating element of a coupler.

Another object is to avoid excessive leakage of gas should a seating element become defective during the act of coupling.

Another object is to eliminate the need to use a wrench either for coupling or for uncoupling. Among the advantages of dispensing with the use of a wrench is the avoidance of delay in case a wrench is lost or misplaced.

A further object is to lessen the time and effort required in coupling and uncoupling storage vessels at a charging station.

A further object is to relieve strain which induces excessive stress and deterioration of connection, and, incident to this, injury to an operator tightening or loosening the couplings repetitiously over long periods of time.

Still another object is to facilitate manufacture of handwheel and nut combinations having uniform handwheels combined with nuts of various thread sizes, threaded either externally or internally, preferably nuts that are externally alike in a region where the nut and handwheel are bonded together.

A feature of the invention is a seating element so placed that it does not extend forward of the tip of the gland portion of the coupler, so that the seating element is not in direct contact with the high velocity stream of gas.

Another feature is that the seating element is in the form of a sleeve, tube or ring, open at both ends, so that it may be assembled in sliding fit upon the gland element and may be put on either way around.

Another feature is that if the seating element is absent during coupling, due to failure, breakage, omission or other cause, another portion of the gland element moves up to an opposing seating surface to make a temporary or emergency seal, thereby reducing leakage until the gas stream can be shut off.

A further feature is the adaptability of the coupler to a process of die casting of a uniform type of hand grip knob bonded to any desired type of nut and incorporating a uniform nut configuration in the region of bonding between nut and handwheel.

A further feature is the provision of a type of hand grip knob suitable for spinning between the palms or fingers of two hands for rapid preliminary tightening.

Still another feature is that the hand grip knob is large enough to be gripped by the full hand for final tightening and of such detail with respect to the valve to which it is attached that injury such as pinched fingers will not occur.

Another feature is a sliding fit of the seal ring upon a cylindrical metal section of the gland upon which it is mounted, so that as the nut is tightened, the ring need not turn under the frictional force exerted by the nut upon the gland but may be wedged against the tapered surface of a recessed fitting to form a seal.

In addition, a universal gland is provided which is so designed with reference to a given group of recessed fittings with which it is to be connected that the gland can seat properly in any recess having a conical angle lying within a considerable range of angles, without the tip striking any obstruction before the sealing ring seats upon the conical wall of the recess, and without the driven shoulder of the gland, or any other part of the gland striking an obstruction before the sealing ring can seat. Furthermore, the universal gland is so designed that in the absence of the sealing ring, some suitable predetermined other part of the gland will meet up with some portion of the recessed opposing fitting to form a temporary or emergency seal.

Other objects, features and advantages will appear from the following more detailed description of illustrative embodiments of the invention, which will now be given in conjunction with the accompanying drawings.

In the drawings:

FIGURE 1 is an overall view, partly broken away, of a pair of connectors in a line, embodying features of the invention;

FIGURE 2 is a generally sectional view on an enlarged scale of a connector including a gland, an internally threaded nut, and a handwheel, facing an externally threaded mating fitting;

FIGURE 3 is a generally sectional view on an enlarged scale of the fittings shown in FIGURE 2 with the gland in seating position in the paired fitting;

FIGURE 4 is an exploded view, partly in section, of a gland embodying features of the invention;

FIGURE 5 is an elevational view partly in section, of an alternative gland structure;

FIGURE 7 is a generally sectional view on an enlarged scale of a coupler fitting including a gland, an externally threaded nut, and a handwheel enmeshed with an internally threaded fitting;

FIGURE 11 shows, partially in section, a universal gland without a sealing ring, in which an emergency seal is formed by the tip of the gland contacting the conical wall of a recessed fitting;

FIGURE 12 is similar to FIGURE 11, except that the emergency seal is formed by the periphery of an annular seating face of the gland, which face normally makes a rear seal with the sealing ring, said periphery contacting the conical wall of a recessed fitting;

Figure 6:
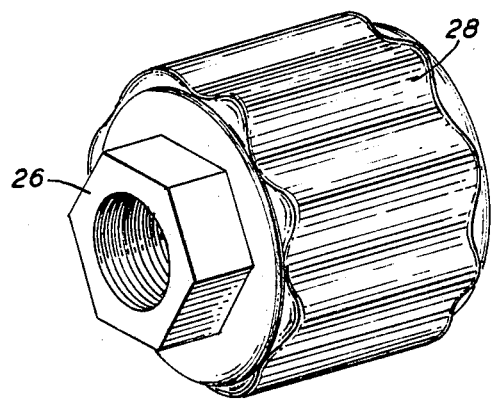
FIGURE 6 is a perspective view of a unitary combination of a handwheel and an internally threaded nut.

FIGURE 13 is similar to FIGURES 11 and 12, except that the emergency seal is formed by the driven shoulder of the gland contacting an annular seating face provided within the recessed fitting; and FIGURE 14 is similar to FIGURE 11, except that the recess in the recessed fitting is deeper and the emergency seal is formed by the driven shoulder of the gland contacting an external annular surface of the recessed fitting.

Referring to the drawings:

FIGURE 1 shows preferred forms of couplers for connecting, for example between a line and a high pressure gas supply manifold and between a line and a gas storage vessel, embodying features of the invention.

The line comprises a tube 20 provided with connecting fittings at both ends, which fittings are hand operable without the need for a wrench. The left-hand end of the tube is shown having a gland attached thereto, the exposed portions of the gland showing at 22, 24. An internally threaded nut for tightening the forward portion 22 of the gland in seating relationship to a paired externally threaded fixture (not shown in this figure) appears at 26 partly cut away to show the gland portion 22 and the internal threading of the nut. Attached to the nut 26 is a handwheel 28 which in the figure hides the middle portion of the gland betwen the exposed portions 22 and 24.

The right-hand end of the tube 20 is shown having an identical gland attached thereto, the exposed portion of this gland appearing at 30. An externally threaded nut 32 is shown for tightening the forward portion 30 of the gland in seating relationship to a paired internally threaded fixture (not shown in this figure). Attached to the nut 32 is shown a handwheel 34 which is identical to the handwheel 28. A portion of the nut 26 is embedded in the handwheel 28 as is likewise a portion of the nut 32 embedded in the handwheel 34. The embedded portions of the respective nuts 26 and 32 are preferably identical, while the exposed portions of the nuts are illustrated as being different, providing internal and external threading respectively, although a given line may be provided with identical nuts at the two ends according to the requirements of a given use.

The tube 20 is illustrated in FIGURE 1, as having a dog-leg shape which makes it particularly well adapted for connecting standard gas cylinders, of a variety of different heights, to a gas manifold located at a given fixed height above the platform upon which the cylinders stand. To adjust a given cylinder to a given manifold, the coupling may be loosened at the manifold end and the other end may be swung through an arc to the level of the cylinder inlet fitting, whereupon tight connections may be made at both ends of the coupling. With the type of coupling fittings herein disclosed, both connections can be tightened by hand without the use of a wrench.

The tube 20 may take other forms, such as a pigtail, etc., as in a system where all cylinders are of the same height.

FIGURE 2 shows in more detail than FIGURE 1 an exemplary fitting of the type having an internally threaded tightening nut, aligned with a paired fitting either in a manifold or in a storage vessel, or the like, before meshing and tightening the connection. The tube 20 is shown attached to a universal gland 40 with the nut 26 and handwheel 28 in place slidably mounted upon the gland 40. The gland 40 is provided with a driven shoulder 42 against which the nut 26 can bear for tightening. The gland 40 is slidable through central holes in the nut 26 and handwheel 28, and, since the shoulder 42 will not pass through these holes, the nut and handwheel are assembled upon the gland before the gland is attached to the tube 20. Illustrative internal arrangements in the gland 40 to facilitate the attachment of a tube thereto are shown in FIGURES 4 and 5.

Forward of the shoulder 42, that is, to the left in FIGURE 2, the gland 40 has a cylindrical ring type of seating member 44 held against a backup or step portion 46 by a retaining device 48 inserted between the ring 44 and a tip portion 50. The portion 46 is provided with an annular seating surface 45 against which bears the rearward portion of the ring 44. Rearward of the shoulder 42, the gland has an elongated shank 52.

The paired fitting shown at 54 has an external thread 56 and a cylindrical recess 58, the latter leading into a conical recess 60, illustrated as having a conical angle of 70 degrees, which in turn leads into a cross-drilling 62 which may lead to a valve (not shown). The nut 26 is internally threaded as at 64 to mate with the externally threaded portion 56 of the fitting 54.

FIGURE 3 shows the fittings of FIGURE 2 after tightening of the coupling. The thread 64 of the nut 26 is meshed with the thread 56 of the fitting 54, the nut having been advanced until the shoulder 42 is urged leftward forcing the ring 44 against the conical recess 60 and the rear flat surface of the ring 44 against the annular seating surface 45 to form the required seals. There is thus formed a sealed passage comprising the tube 20, the interior of the gland 40, the recess 60 and the cross portion 62.

FIGURE 4 shows parts of the gland 40 disassembled, and also a cut-away view of one form of internal structure of the gland wherein provision is made for fastening the tube 20 to the gland. Forward of the annular seating face 45 of the back-up portion 46 there is provided a reduced diameter portion 70 to receive the ring 44, which portion 70 has a circumferential groove 72. The ring 44 is shown as cylindrical, open at both ends, so that it can be slid over the step 70 and held in place by the retaining device 48 which is preferably in the form of a severed ring designed to be snapped into the groove 72.

The seating ring 44 is made of a material that is hard, yet slightly deformable, and resilient. It should retain its dimensions with repeated use and not exhibit cold flow. For use with high pressure oxygen gas the material must be compatible therewith. In this connection, the heat of combustion of the material is significant in predicting resistance to combustion or deterioration with oxygen at hgh pressures such as 2400 to 2600 p.s.i. I have found that materials with heats of combustion of 2000 B.t.u. per pound or less are suitably resistant in this respect.

Non-metallic substances, for example plastics, are suitable, although relatively soft metal such as lead might be used in some cases. Examples of suitable palstics are certain polydichlorofluoroethylene compounds obtainable commercially under designations Unplasticized Kel-F and Plaskon from The Fluorocarbon Co., Palo Alto, Calif., Phoenix, Ariz., and Pine Brook, N. J.

The ring 44 preferably makes a sliding fit upon the cylindrical metal section 70 of the gland. As the nut is tightened to seat the ring 44, the nut and the gland may tend to rotate together under the frictional force exerted by the nut upon the gland. The ring 44, being free on the surface 70 may not rotate and is pressed against the tapered surface in the recess to form a seal by a wedge action. The ring 44 normally cannot slide off the section 70 with the retaining ring 48 in place. In prior art designs, of which I am aware, there is no positive protection against a seal ring coming off. In some prior designs, the seal member is threaded onto a surface like that of the section 70. The ring is then subject to unscrewing and falling off. Furthermore, it may partially unscrew, for example a half turn or so, in which case when a connection is made the force of the nut may cause the relatively soft threads of the seal ring to shear off until the rear face of the ring bears against the gland. The ring will then be likely to fall off at the next opportunity. If instead of a screw connection, a press fit is provided, the resulting distortion of the relatively soft seal ring will render the connection unreliable. If a set screw or pin is used to fasten the seal ring in place, the ring is distorted and furthermore, is not conveniently removable when it is to be replaced.

As disclosed herein, the seal ring 44, in addition to making a positive forward seal, makes a second positive seal between its rear face and the forward face 45 of the section 46 of the gland to stop leakage of gas under the ring 44 in the annular space between the ring 44 and the surface of the section 70. None of the other means of mounting the ring 44 mentioned above will positively provide this rear seal, which is evidently essential in any case where the seating member is a separate piece mounted upon the gland and not integral with the gland. This seal is just as essential as the forward seal between the ring 44 and the wall of the mating fixture.

The outer edges of the ends of the ring 44 are preferably suitably rounded to form a seating as indicated at 74, whichever end is forward. The retaining ring 48 is preferably a commercially obtainable one with suitable springiness for easy insertion and removal.

The rearward portion of the gland 40 is threaded either internally as shown at 76 in FIGURE 4 or externally as at 77 in FIGURE 5, for receiving a mating threaded end of the tube 20. In addition to a threaded connection, a gas-tight seal may be made by soldering the tube 20 to the gland 40.

FIGURE 6 shows in perspective a preferred unitary combination of the internally threaded nut 26 and the handwheel 28. The unit is preferably formed by die casting the handwheel about a portion of the nut. For the purpose of bonding the nut and handwheel firmly together, the nut is preferably provided with a circumferential groove 66 as shown in FIGURE 2. The groove 66 (FIGURE 2) resists separating of the parts in the axial direction. The hexagonal or other non-circular form of the nut resists torsion between the parts with respect to the central axis. The portion 29 of the handwheel that wraps around onto the back face of the nut resists a tendency to separate the parts by excess leverage exerted by the handwheel upon the nut.

The shape of handwheel illustrated is suitable to be spun between the palms or fingers of two hands for preliminary tightening of the connection. A suitable size for the handwheel is a diameter of about two and a half inches and an axial length of about one and a half inches. The handwheel is then approximately of optimum size and shape to be gripped by the operator's full hand for final tightening. The handwheel may be so placed with reference to the valve handle and other parts of the valve to which it is attached that injury to the user such as pinched fingers will not occur.

The handwheel is preferably die-cast, of a material that provides tight gripping of the nut due to contraction of the die-cast material while solidifying. Furthermore, the material should be capable of being cast at forming temperatures that will not deleteriously affect brass or steel nuts, and in use the die-cast material should not break or corrode. An example, of a suitable die-casting material is product called Zamak, obtainable from Newton-New Haven Co., West Haven, Conn.

FIGURE 7 shows in more detail than FIGURE 1 an illustrative fitting of the type having an externally threaded nut, enmeshed with a paired fitting in a storage cylinder, manifold or the like. The gland is of the same universal type shown in FIGURE 2. The nut 32 has the same groove 66 in the same position as in the nut 26, the portion of the nut which is embedded in the handwheel 28 being the same both in the case of the nut 26 and of the nut 32. The nut 32 is externally threaded at 80. The paired fitting is shown in fragmentary view at 82 and has a recess 83 with an internal thread 84 meshing with the thread 80 on the nut 32. The recess 83 leads into a conical recess 86, illustrated as having a conical angle of 60 degrees, which in turn leads into a short cylindrical bore 88, and thence into a short conical transitional space 90, followed by a cylindrical bore 92 which leads to a valve (not shown). The nut 32 has been advanced until the shoulder 42 of the gland is urged leftward forcing the ring 44 against the wall of the conical recess 86 to form the forward seal and against the seating face 45 to form the rear seal.

The overall length of the gland is made sufficient for use both with internally threaded nuts and with externally threaded nuts. The length is greater than previously used in the art in order to provide sufficient stock for a reasonable number of repairs to the junction of gland and tube, including re-threading.

Figure 8:
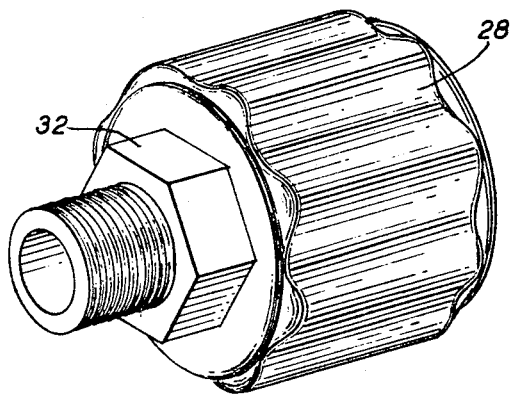
FIGURE 8 is a perspective view of a unitary combination of a handwheel and an externally threaded nut.

FIGURE 8 shows in perspective a preferred unitary combination of externally-threaded nut 32 and handwheel 28. This unit is formed in the same manner as the unit shown in FIGURE 6.

Figure 9:
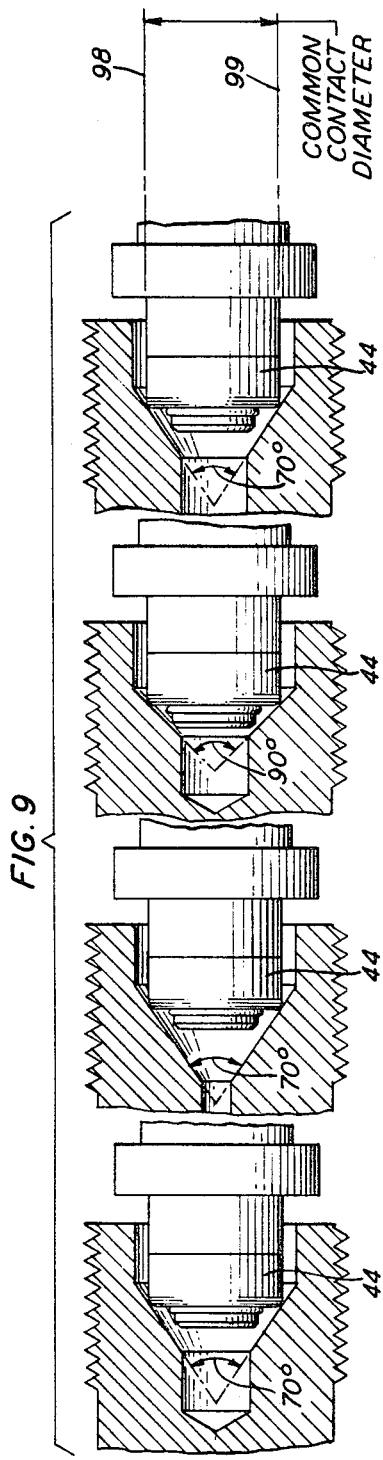
FIGURE 9 shows, partially in section, respective seating positions of a universal gland in a variety of externally threaded recessed fittings, indicating diagrammatically a common contact diameter of seating in all cases.
Figure 10:
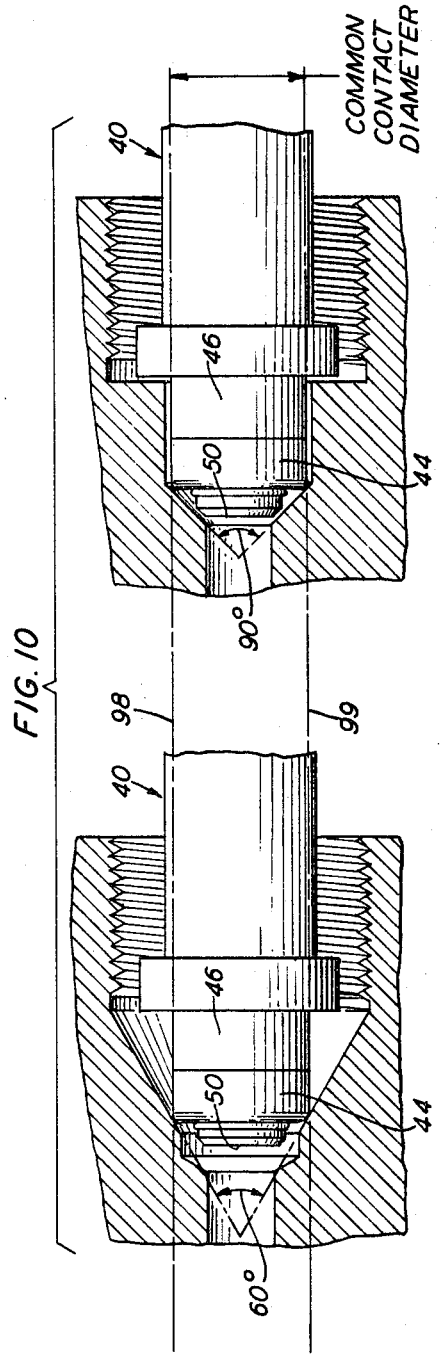
FIGURE 10 is similar to FIGURE 9, except that the recessed fittings shown are internally threaded.

FIGURES 9 and 10 show a variety of recessed fittings illustrative of connections to valves in common use either in manifolds or in storage vessels employed in the compressed gas industry, showing the universal gland of the present invention seated in each fitting on a common contact diameter indicated between broken lines 98, 99. The fittings shown in FIGURE 9 are externally threaded and those shown in FIGURE 10 are internally threaded. Various internal conical angles are illustrated, specifically 60, 70 and 90 degrees. Cylindrical recesses of various axial lengths are combined with the conical portions and characterize a variety of designs standard in the compressed gas industry. It will be understood that other designs of fittings may be used provided they are so dimensioned as to permit seating contact by the ring 44 upon a common contact diameter.

It is common practice in the industry to employ codes for distinguishing between fittings used for handling particular gases, such as oxygen, nitrogen, argon, helium, etc., by a selection of internal or external threads and of inside and outside diameters of threaded parts. Threads of sufficiently different diameters will not mesh. In this way, apparatus for different services is readily distinguishable, and couplers can be provided which can be used only in the particular services to which they are adapted by the code. Ths is a safety precaution for the avoidance of injury to personnel and equipment due to mistake in the identity of the gas to be transferred.

FIGURES 9 and 10 demonstrate graphically that the universal gland 40 disclosed herein will seat correctly into any conical recess having one of the conical angles 60, 70 or 90 degrees, or in fact any angle between about 60 and 90 degrees. In each case, the ring 44 will seat upon the surface of the conical recess before the tip 50 can strike the same surface. It will be evident that the dimensions of the gland can be varied to accommodate other conical angles, if desired. The back-up portion 46 of the gland 40 should be made of sufficient length so that the shoulder 42 does not strike the paired fitting before the ring 44 can seat in the conical recess.

FIGURES 11 through 14 show recessed fittings which provide various types of secondary seal which can occur when the ring 44 is not in place. In FIGURE 11, the tip 50 of the gland seats upon the conical wall before the step portion 46 can strike the conical wall and before the forward face of the shoulder 42 can strike the outer face 102 of the recessed fitting. The emergency seal in this case is between the tip 50 and the conical wall. The tip 50 is preferably bevelled to improve emergency seating.

In FIGURE 12, in the absence of the ring 44, the tip 50 moves into the cylindrical recess 104 before the step portion 46 seats against the conical recess as shown. This seating takes place before the shoulder 42 can strike the face 106 of the fitting. The emergency seal in this case is between the step portion 46 and the conical wall.

In FIGURE 13, in the absence of the ring 44, the tip 50 moves into the conical recess, and the step portion 46 moves into the cylindrical recess 108, before the shoulder 42 seats against the face 110 of the fitting, which seating forms the emergency seal in this case.

In FIGURE 14, in the absence of the ring 44, the forward face of the shoulder 42 makes an emergency seal by seating against the outer face 102 of the recessed fitting. Comparing FIGURES 14 and 11, it will be evident that the difference in the location of the emergency seal is occasioned by the deepening of the cylindrical recess in the fitting of FIGURE 14. A similar result would occur if the cylindrical section 70 of the gland were shortened.

It will be evident that, given a group of recessed fittings with a common contact diameter, to be served by a common gland, the various portions of the gland can be so designed that (1) no part of the gland will interfere with seating of the ring 44 upon the common contact diameter, and (2) in the absence of the ring 44, some part of the gland will seat to form an emergency seal upon some suitable surface of the recessed fitting.

Field trials of 50 couplers made in accordance with the invention were carried on, in the course of which about 50,000 couplings were made over a period of six months in regular production cylinder charging. During the entire trial, no coupler developed a need for repair or service other than replacement of the ring 44, which replacement, when needed, was in each case made with the coupler in place on the manifold. The handwheels, nuts, and coupling tubes appeared at the end of the trials to be in as good condition as when first installed.

In contrast, one-piece brass glands commonly used in this service require frequent re-threading and re-soldering into coupler pipe. This operation requires removal of the coupler from service during reconditioning. The reconditioning can be done only a few times before the gland is unfit for further use. An average useful life of less than one year as been the usual experience for the gland at the cylinder end when in steady, high production service.

The cause of failure at the joint between the tube and the gland in wrench-tightened glands is frictional rotative forces between the wrench-operated nut and the shoulder of the gland. The forces exerted in seating with a wrench are much greater than those exerted in hand seating to such degree as to overstress the metals. In addition, with hand tightening, there is less tendency of the gland to turn. Also, the use of a longer gland results in less restriction of the gland by the nut. Under the conditions holding with hand tightening instead of wrench tightening, it has been found possible to use a harder solder with satisfactory results at the joint between the gland 40 and the tube 20 than was possible heretofore.

A ring of Unplasticized Kel-F that has been used successfully as the ring 44 has an outside diameter of 0.490 inch, an inside diameter of 0.3125 inch and an axial length of 0.1875 inch. The seating edges 74 are rounded off with a radius of 0.025 to 0.030 inch. The axial distance between the forward or seating end of the ring 44 and the tip 50 of the gland upon which this ring is mounted and used is one-sixteenth inch. The axial length of step 70 is 0.1875 inch to match the axial length of the ring 44; the axial length of the back-up portion 46 is about 0.220 inch; the axial length of the driven shoulder portion 42 of the gland is about 0.170 inch; and the shank portion 52 is about one and twenty-seven thirty-seconds inch long. The outside diameter of the step 70 is about 0.3125 inch to form a sliding fit with the ring 44; the back-up portion 46 is of outside diameter about 0.490 inch; the shoulder portion 42 is of outside diameter about 0.745 inch; and the shank portion 52 is of outside diameter about nine-sixteenths inch. The inside diameter of the passage within the gland 40 is about three-sixteenths inch. It will be understood that the foregoing dimensions are illustrative of values that have been successfully used but are not intended to be limiting.

The nut 26 or 32 may be either of brass or other suitable matetrial, or it may be of special material for thread shaping, for example hardened steel. Either the ordinary nut or the thread shaping nut may be used as desired at either end of a coupler. Usually it will be advantageous to provide a thread shaping nut where a connection is made to a storage vessel because the thread conditions may vary from cylinder to cylinder and because the connection is made very frequently in normal service. An ordinary nut such as a brass nut is suitable for use at the manifold end because coupling and uncoupling will normally occur at less frequent intervals, for example when changing from cylinders of one height to cylinders of another height, occasioning relatively less wear and tear on the threads.

While illustrative forms of apparatus and methods in accordance with the invention have been described and shown herein, it will be understood that numerous changes may be made without departing from the general principles and scope of the invention.

I claim:

1. In a connector for use in a high pressure gas line in combination, as a first connecting member, a tube for passage of gas, said tube having a plurality of stepped substantially cylindrical external portions of graduated diameters from a tip portion upward in diameter in successive steps from said tip portion; a second connecting member containing a recess for receiving said tube, said recess having a frusto-conical portion tapering inwardly and having substantially cylindrical portions opening from said tapering portion at each end thereof, a hard yet slightly deformable sealing sleeve slidably mounted upon one of said stepped portions on said tube, said sleeve being substantially devoid of cold flow and having an axial length less than said one of said stepped portions and having an outside diameter of size adapted to seat at a leading edge of said sleeve at an intermediate diameter of said frusto-conical recessed portion; means to apply pressure between said recessed member and a stepped portion of said tube of larger diameter than said sleeve to exert axial pressure upon the said leading edge of said sleeve directed against said frusto-conical portion of said recessed member, and means for driving said pressure exerting means to effect a seal between said sleeve and said frusto-conical portion to prevent leakage of gas from said connector in said pressure range, said stepped portions so proportioned in relative diameters with respect to the inside diameters of successive portions of the said recessed member that no part of said tube will interfere with seating of said sleeve when the latter is in place, and, in the absence of said sleeve, movement of the tube into the recess beyond the normal seating position brings one of said stepped portions of the tube into contact with the wall of the recess to form an emergency seal.

2. Apparatus in accordance with claim 1, in which said stepped portions of said tube comprise a driven shoulder portion, a spacing portion forward of and of lesser diameter than said driven shoulder portion, said tip portion being forward of and of lesser diameter than said spacing portion, said tip portion being sufficiently short to be clear of said frusto-conical recess portion when the sealing sleeve is sealingly seated in said frusto-conical portion of said recess, and said spacing portion being long enough to prevent the said driven shoulder from striking any part of the recessed member before the sealing sleeve can seat.

(References on following page)

References Cited

UNITED STATES PATENTS

| | | | |
|---|---|---|---|
| 494,801 | 4/1893 | Weber | 285—354 X |
| 1,099,129 | 6/1914 | Robinson | 285—379 X |
| 1,524,361 | 1/1925 | Lowrey. | |
| 2,242,291 | 5/1941 | Deming | 285—169 X |
| 2,480,229 | 8/1949 | Dow. | |
| 2,560,263 | 7/1951 | Wiegand et al. | 285—347 X |
| 2,813,567 | 11/1957 | Williams | 285—334.4 X |
| 2,932,305 | 4/1960 | Kirche | 285—40 X |

FOREIGN PATENTS

| | | |
|---|---|---|
| 781,227 | 2/1935 | France. |
| 891,167 | 11/1943 | France. |
| 487,967 | 6/1938 | Great Britain. |
| 721,163 | 12/1954 | Great Britain. |
| 1,048,103 | 12/1958 | Germany. |
| 108,814 | 10/1943 | Sweden. |

CARL W. TOMLIN, *Primary Examiner.*

DAVE W. AROLA, *Assistant Examiner.*